Nov. 3, 1959  N. E. SAFARIK ET AL  2,910,801
TRAP FOR CRUSTACEANS
Filed Feb. 18, 1957

INVENTORS
NORMAN E. SAFARIK
HENRY B. LOUGHEED
BY
Fetherstonhaugh & Co.
ATTORNEYS Nov. 3, 1959 N. E. SAFARIK ET AL 2,910,801
TRAP FOR CRUSTACEANS
Filed Feb. 18, 1957 3 Sheets-Sheet 2

INVENTORS
NORMAN E. SAFARIK
HENRY B. LOUGHEED
BY
Fetherstonhaugh & Co.
ATTORNEYS Nov. 3, 1959   N. E. SAFARIK ET AL   2,910,801
TRAP FOR CRUSTACEANS Filed Feb. 18, 1957   3 Sheets-Sheet 3

INVENTORS
NORMAN E. SAFARIK
HENRY B. LOUGHEED
BY
Fetherstonhaugh & Co.
ATTORNEYS

# United States Patent Office 2,910,801
Patented Nov. 3, 1959

2,910,801

TRAP FOR CRUSTACEANS

Norman E. Safarik, Burnaby, British Columbia, and Henry B. Lougheed, Crescent Beach, British Columbia, Canada Application February 18, 1957, Serial No. 640,933

9 Claims. (Cl. 43—105)

This invention relates to a trap for crustaceans, such as crabs, lobsters and shrimp.

Trips for crustaceans are very bulky, and prior to this invention, they were stacked on the boat decks going to and from the fishing grounds. This means that a boat could only handle a limited number of traps. The present invention overcomes these difficulties by providing a trap which may be collapsed into a comparatively flat bundle so that a boat may now carry many more traps than was originally possible.

A trap according to this invention includes a collapsible frame, a net substantially in tubular form stretched over the frame, means connected to the frame for releasably maintaining it in erect position to keep the net taut, a conical entrance formed of net at each end of the net tube and extending inwardly of the latter and having a relatively small opening at its inner end, and means extending between the inner ends of the conical entrances to keep the net forming the latter taut. The net tube and entrances collapse when the frame is allowed to collapse.

Figure 1:
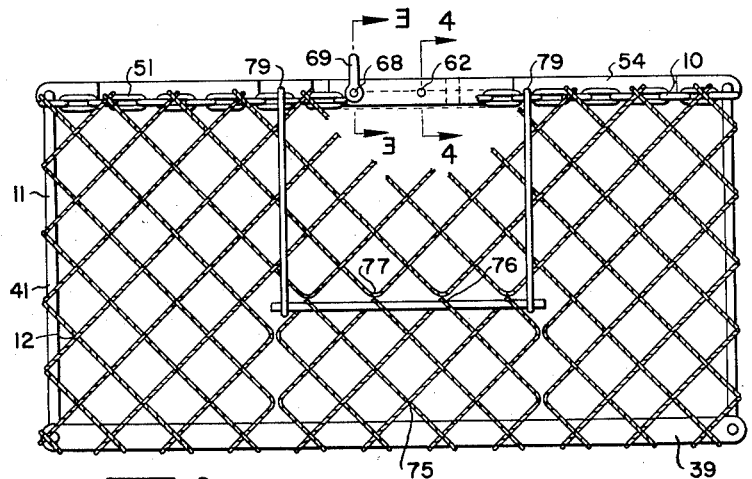
Figure 2:
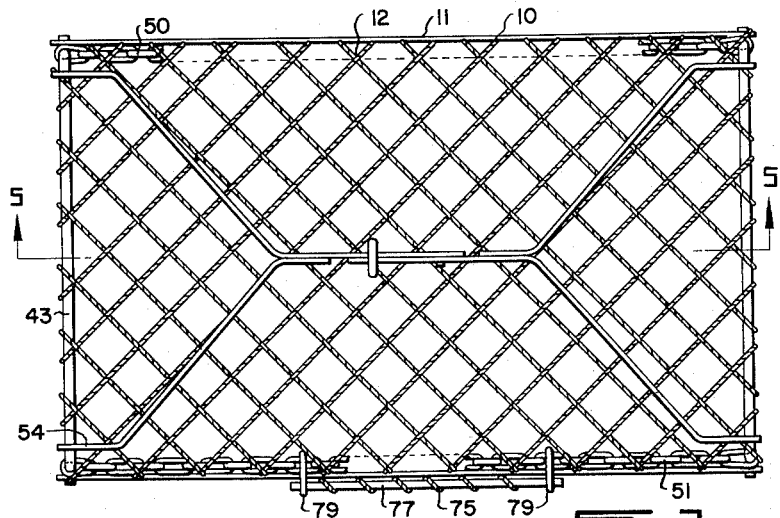
Figure 3:
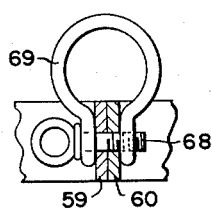
Figure 4:
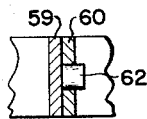
Figure 5:
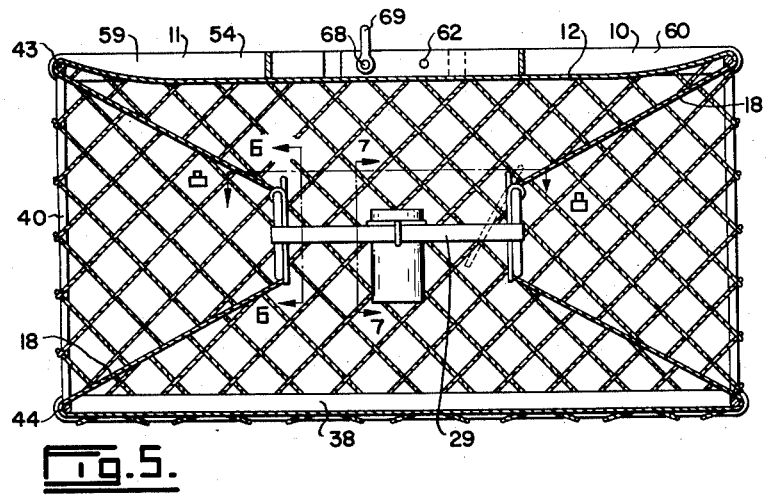
Figures 6, 7:
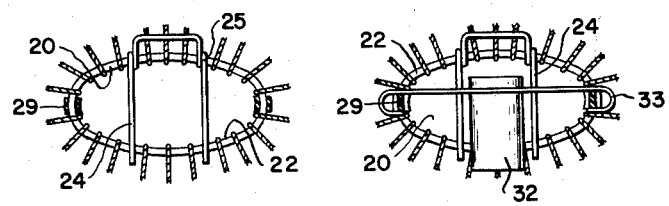
Figure 8:
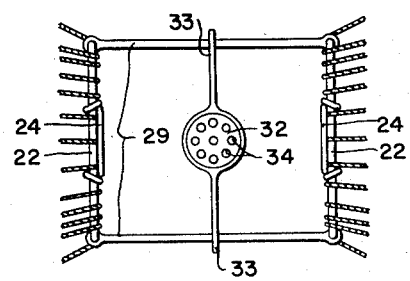
Figure 9:
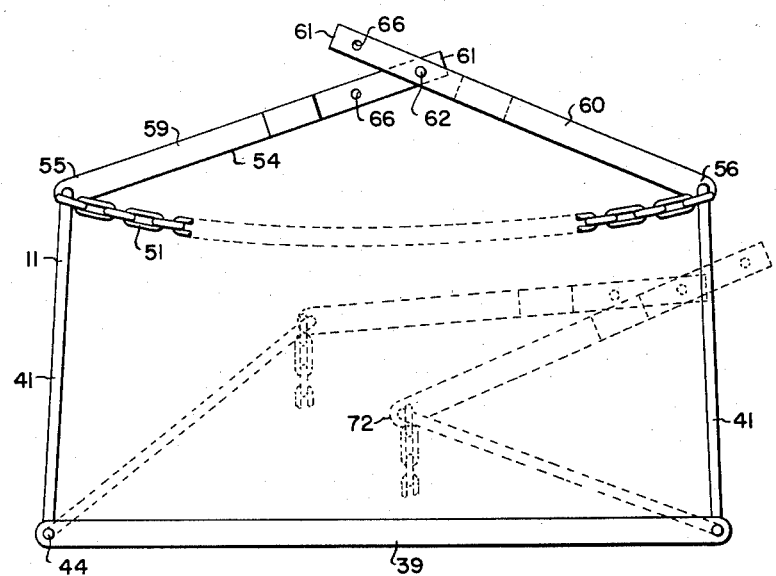
Figure 10:
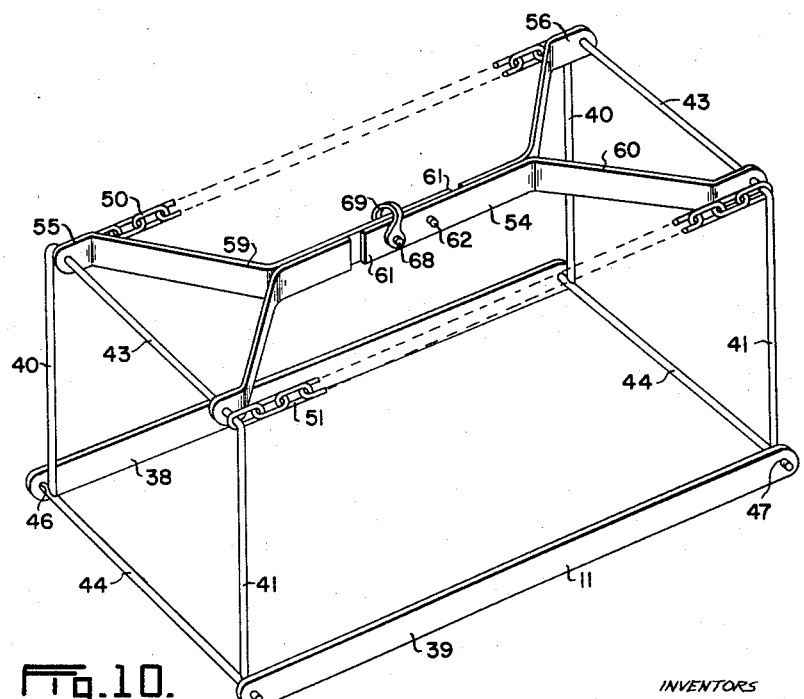

An example of this invention is illustrated in the accompanying drawings, in which, Figure 1 is a side elevation of the trap set up for operation, the parts in the interior thereof which would ordinarily be seen through the net being omitted for the sake of clarity, Figure 2 is a plan view of the trap shown in Figure 1 with the interior details omitted, Figure 3 is an enlarged fragmentary section taken on the line 3—3 of Figure 1, Figure 4 is an enlarged fragmentary section taken on the line 4—4 of Figure 1, Figure 5 is a longitudinal section taken on the line 5—5 of Figure 2 showing the interior details of the trap, Figure 6 is a vertical fragmentary section taken on the line 6—6 of Figure 5, Figure 7 is a vertical fragmentary section taken on the line 7—7 of Figure 5, Figure 8 is a horizontal fragmentary section taken on the line 8—8 of Figure 5, Figure 9 is a side elevation of the trap frame alone, illustrating the manner in which it may be collapsed, and Figure 10 is a perspective view of the trap frame in its erected position.

Referring to the drawings, the crustacean trap 10 includes a collapsible frame 11 which is enclosed by a net 12 which is substantially tubular in form and is stretched over the frame. The trap preferably has an entrance at each end thereof, but it may have only one entrance, in which case, the other end of the trap is closed in any suitable manner, such as by a net end closure.

By referring to Figure 5, it will be seen that the trap 10 is provided with a conical entrance 18 at each end thereof, said entrance being formed of net, and, as shown, is preferably part of the net tube 12 which extends around the end of the frame and is positioned inwardly of the tube. Each conical entrance has a relatively small opening 20 in its inner end, the size of this opening determining the purpose of the trap. For shrimp, the opening would be very small, but for crabs and lobster, it would be larger than the shrimp opening. Each opening 20 is formed by a ring 22 to which the net forming the conical entrance is secured. The opening may or may not be provided with suitable trap means. In this example, a flap 24 formed of wire is swingably mounted at 25 on the upper part of each ring 22. This flap is so mounted that it may swing inwardly of the trap, as shown in dotted lines at the right end of Figure 5, but it cannot swing outwardly behind the ring or opening. This allows crustaceans to move into the trap, and prevents them from getting out again.

When the conical entrances 18 are formed of net, it is necessary to provide means for maintaining them in their proper shape when the trap is erected. In the illustrated example, a connector 29 extends from one ring 20 to the other of said rings and is connected thereto. This connector prevents the rings from moving outwardly so that the conical entrances retain their proper shapes as long as the trap frame is in its erected position.

Suitable means may be provided for holding bait in the trap. This may be in the form of a container 32 having laterally projecting arms 33 mounted on the sides of connector 29. This container has holes 34 in the top and bottom thereof in order to retain bait therein while allowing water to pass through it.

The frame 11 of trap 10 is clearly illustrated in Figures 9 and 10. This frame includes two parallel stiff side bottom members 38 and 39, stiff vertical supports 40 and 41 hingedly connected to both ends of members 38 and 39 respectively, and upper and lower spacers 43 and 44 connected to the upper and lower ends of each pair of supports 40 and 41 at each end of the trap. A simple way of constructing the spacers and supports, and hingedly connecting them to the bottom members is clearly illustrated in Figure 10. Supports 40—41 and spacer 43 are formed by a single piece of U-shaped metal, the free ends of which are secured to spacer 44 near the ends thereof, and the ends of the latter spacer extend through holes 46 and 47 in bottom members 38 and 39. Thus, the unit consisting of supports 40—41 and spacers 43—44 forms the end of the frame and is hingedly connected to the bottom members.

It is preferable, but not absolutely necessary, to provide flexible braces 50 and 51 extending between the upper ends of supports 40 on one side of the frame, and between the upper ends of supports 41 on the opposite side thereof. These braces permit the end units of the frame to swing inwardly, but they cannot swing outwardly beyond the vertical.

Suitable means is provided for releasably locking frame 11 in its erected position. This is accomplished by a stiff brace 54 normally extending parallel to bottom members 38 and 39 and hingedly connected at its ends 55 and 56 to the upper spacers 43 at the ends of the frame. This brace is formed in two sections 59 and 60 which partially overlap at their inner ends at 61, and the overlapped portions are pivotally connected together by a pin 62. By referring to Figure 2, it will be seen that each of the sections 59 and 60 of the brace is in the form of a Y, the top of which is hingedly connected to one of the spacers 43 near the ends thereof. Suitable means is provided for releasably securing the overlapped portions of the braced sections together to maintain the stiff brace parallel to the bottom members. In this example, the overlapped portions of sections 59 and 60 are provided with holes 65 and 66 which are in registry when the brace is in its horizontal or extended position, and the pin 68 of a shackle 69 extends through said holes, see Figures 1 and 3.

The net tube 12 extends around bottom members 38 and 39 and flexible braces 50—51, and its ends are secured to the vertical supports 40—41 and spacers 43—44. In this example, the net forming the tube actually extends around the supports and spacers and into the conical entrances 18 at the ends of the trap. When the stiff brace 54 is in its extended or horizontal position, the net tube 12 is taut, and the net of entrance 18 also is taut, being held by a connector 29. In order to collapse the trap, it is only necessary to withdraw pin 68 of shackle 69 to allow the sections 59 and 60 of the brace to be moved upwardly, as shown in Figure 9. One end of the frame may be swung inwardly, as shown at 72 in Figure 9. This allows the frame completely to collapse so that the trap becomes a comparatively flat bundle.

The net tube 12 is formed with a flap 75 in one side thereof, the free edge 76 of this flap having a bar 77 therealong. This flap may be opened or swung outwardly to permit access to the trap interior, and resilient means such as heavy elastic bands 79 are employed to hold the flap closed. These bands are connected at their upper ends to the flexible brace 51, and at their lower ends they are removably connected to bar 77 so that they may be released from the latter to free the flaps.

What we claim as our invention is:

1. In a trap for crustaceans, a collapsible frame comprising a pair of parallel stiff side bottom members, stiff vertical supports hingedly connected to both members near the ends thereof, spacing means connected to the vertical supports to keep those connected to one bottom member spaced from those connected to the other bottom member, a stiff brace normally extending parallel to the bottom members hingedly connected at its ends to the spacing means, said stiff brace being formed in two partially overlapping sections pivotally connected at the overlap, and means releasably securing the overlapped portions of the brace sections together to maintain the stiff brace parallel to the bottom members.

2. In a trap for crustaceans, a collapsible frame comprising a pair of parallel stiff side bottom members, stiff vertical supports hingedly connected to both members near the ends thereof, a flexible brace secured to the vertical supports of each bottom member spaced from the latter, spacing means connected to the vertical supports to keep those connected to one bottom member spaced from those connected to the other bottom member, a stiff brace normally extending parallel to the bottom members hingedly connected at its ends to the spacing means, said stiff brace being formed in two partially overlapping sections pivotally connected at the overlap, and means releasably securing the overlapped portions of the brace sections together to maintain the stiff brace parallel to the bottom members.

3. In a trap for crustaceans, a collapsible frame comprising parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a stiff brace normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members.

4. In a trap for crustaceans, a collapsible frame comprising a pair of parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a flexible brace secured to vertical supports of each bottom member spaced from the latter, a stiff brace normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members.

5. A trap for crustaceans comprising a pair of parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a net substantially in the form of a tube stretched over the bottom members, vertical supports and upper and lower spacers, an inwardly extending conical entrance at one end of the net within the spacers and supports at said end, means at least partially closing the opposite end of the trap, a stiff brace outside the net normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members and keep the net taut, said brace sections pivoting outwardly when released by the securing means to allow the trap to collapse.

6. A trap for crustaceans comprising a pair of parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a flexible brace secured to the vertical supports of each bottom member spaced from the latter, a net substantially in the form of a tube stretched over the bottom members, vertical supports, flexible braces and upper and lower spacers, an inwardly extending conical entrance at one end of the net within the spacers and supports at said end, means at least partially closing the opposite end of the trap, a stiff brace outside the net normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members and keep the net taut, said brace sections pivoting outwardly when released by the securing means to allow the trap to collapse.

7. A trap for crustaceans comprising a pair of parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a net substantially in the form of a tube stretched over the bottom members, vertical supports and upper and lower spacers, an inwardly extending conical entrance at each end of the net tube within the spacers and supports at said end, each conical entrance having a relatively small opening at its inner end, a bait receptacle within the net tube, a stiff brace outside the net normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members and keep the net taut, said brace sections pivoting outwardly when released by the securing means to allow the trap to collapse.

8. A trap for crustaceans comprising a pair of parallel stiff side bottom members, a stiff vertical support hingedly connected to each end of each bottom member and extending outwardly therefrom, upper and lower spacers connecting the ends of the supports of one bottom member to corresponding ends of the supports of the other bottom member, a net substantially in the form of a tube stretched over the bottom members, vertical supports and upper and lower spacers, an inwardly extending conical entrance formed of net at each end of the net tube within the spacers and supports at said end, each conical entrance having a relatively small opening at its inner end, a connector extending from the inner end of one conical entrance to the corresponding end of the other entrance to keep the net forming said entrances taut, a stiff brace outside the net normally extending parallel to the bottom members hingedly connected at its ends to the upper spacers, said stiff brace being formed in two partially overlapping sections pivotally connected at the overlap, and means releasably securing the overlapped portions of the brace sections together to maintain the stiff brace parallel to the bottom members and keep the net taut, said brace sections pivoting outwardly when released by the securing means to allow the trap to collapse.

9. A trap as claimed in claim 8 including a flap hingedly mounted on the inner end of each conical entrance and extending over the small opening of said entrance, said flap being mounted to swing inwardly only relative to said entrance opening and in a direction away from the net tube end of the latter entrance.

References Cited in the file of this patent

UNITED STATES PATENTS

| | | |
|---|---|---|
| 611,753 | Hoskins | Oct. 4, 1898 |
| 616,924 | Heberling | Jan. 3, 1899 |
| 1,286,423 | Saffry | Dec. 3, 1918 |
| 2,760,297 | Buyken | Aug. 28, 1956 |
| 2,769,274 | Ougland | Nov. 6, 1956 |

FOREIGN PATENTS

| | | |
|---|---|---|
| 114,165 | Germany | Dec. 30, 1899 |